UNITED STATES PATENT OFFICE.

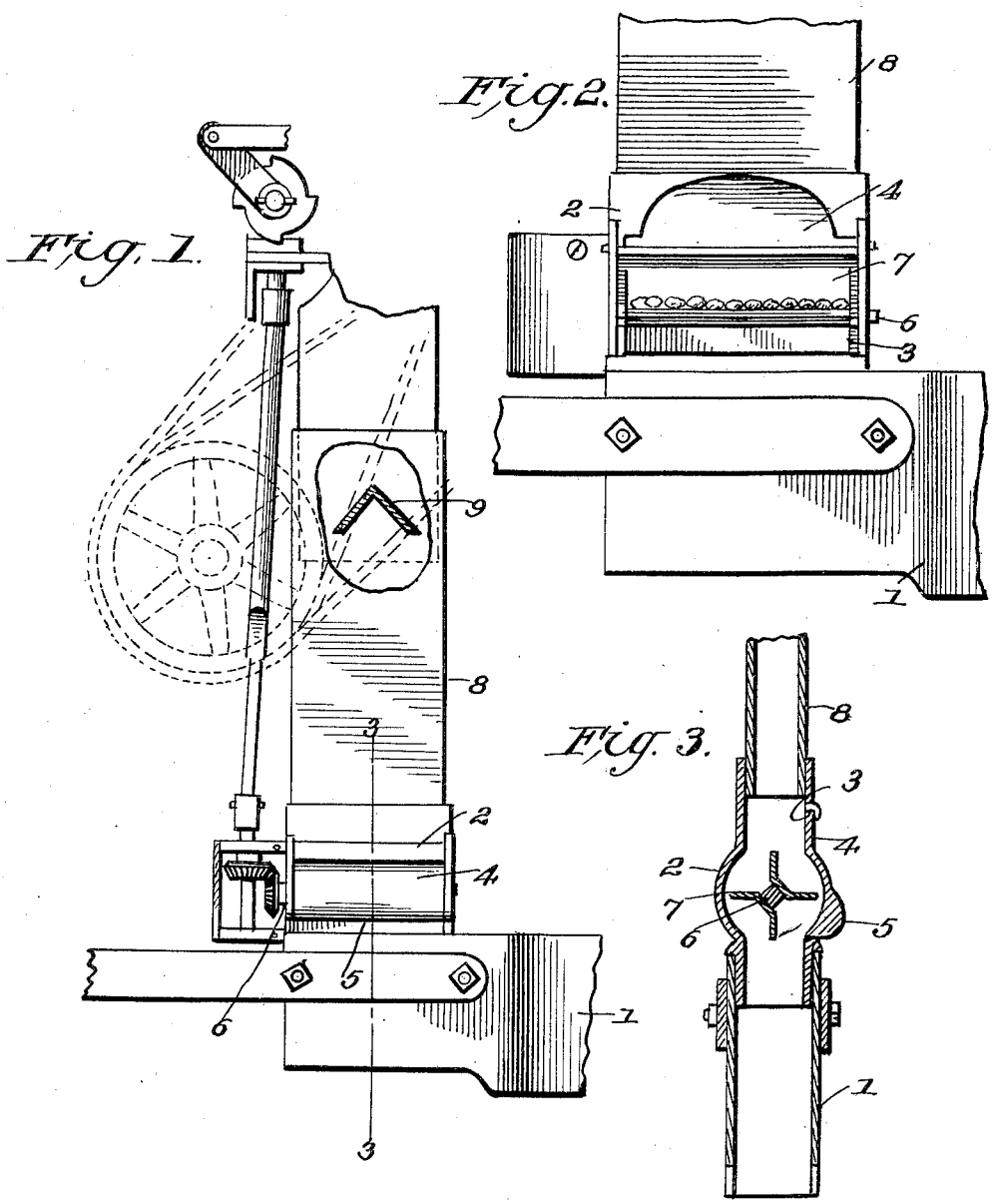

WILLIAM G. JOHNSON, OF KINGFISHER, OKLAHOMA.

SEED-DROPPER.

1,067,175.  Specification of Letters Patent.  Patented July 8, 1913.

Application filed August 23, 1912. Serial No. 716,763.

*To all whom it may concern:*

Be it known that I, WILLIAM G. JOHNSON, citizen of the United States, residing at Kingfisher, in the county of Kingfisher and State of Oklahoma, have invented certain new and useful Improvements in Seed-Droppers, of which the following is a specification.

This invention has relation to seed droppers, and has for its object to provide a dropper of elongated configuration and which is mounted to rotate about an axis disposed in the line of movement of the dropper when it is in operation.

A still further object of the invention is to provide means for distributing the seed along the dropper as it is deposited upon the same.

The ultimate object of the invention is to deposit the seed in the soil in a line or row and not in a bunch or group, as is the usual practice. By having the seed deposited in a line or row extending in the same direction as the hills of the row, the resulting plants may be thinned subsequently with greater ease and more rapidly and with less damage to the plants or plant left standing than if the plants are permitted to spring up in clumps or clusters of no special or predetermined arrangement.

For a full understanding of the invention reference is to be had to the following description and accompanying drawings, in which:

Figure 1 is a side elevation of the seed dropper with parts in section and parts broken away; Fig. 2 is a detail enlarged side elevation of the lower part of the seed dropper; Fig. 3 is a transverse sectional view of the same cut on the line 3—3 of Fig. 1.

Corresponding and like parts are referred to in the following description and indicated in all the views of the accompanying drawings by the same reference characters.

As illustrated in the accompanying drawing, the dropper is mounted upon a shoe 1, although the dropper may be applied to any other form of furrow opener.

The dropper consists of a casing 2 which is open at its upper and lower ends. The casing 2 is elongated in a direction parallel with the long dimension of the shoe 1 and is provided in one side with an opening 3 which is normally closed by a door 4. This door is hinged at its upper portion to the upper part of the casing and the free edge portion of the door 4 is weighted as at 5 so that under normal conditions the said weighted portion will hold the door 4 closed over the opening 3. The inner side of the door 4 is concaved and the opposite side of the casing 2 is concaved, thereby increasing the transverse sectional area of the interior of the casing at the door opening.

A shaft 6 is journaled in the casing 2 at the forward and rear ends thereof. The said shaft 6 is concentrically positioned with relation to the concavities in the door and the side of the casing 2 when the door is closed. The said shaft is also located midway between the side edges of the openings at the upper and lower ends of the casing. Any suitable means may be provided for rotating the shaft 6, but preferably the said shaft is rotated by means which is operated by the usual wire and check row button.

Radially disposed blades 7 are mounted upon the shaft 6 and extend the length of the opening through the casing 2. These blades are spaced from each other and as shown four blades are provided, they being located at angles of 90° from each other. This relation may be varied and greater or less number of blades may be used, if desired. Therefore the blades 7 rotate about the axis of the shaft 6 and in a direction transversely to that in which the said shaft moves with the casing and shoe. A chute 8 is connected with the upper end of the casing 2 and in the present instance the said chute is composed of two telescopic sections, but the chute may be continuous. The object in providing the telescopic sections is that the said sections may have movement with relation to each other as the shoe or furrow opener is moved vertically with relation to the frame to which it is attached.

A member 9 is provided in the upper portion of the chute 8 and the end portions of the upper side of the said member are in anticlinal relation. The ends of the member 9 are spaced from the forward and rear sides of the chute 8, but the side edges of the member 9 are attached to the sides of the chute 8. Therefore as the seed is dropped upon the member 9 in a cluster, the cluster is separated and the seed passes down along the anticlinal surfaces of the said member and falls from the ends thereof down upon the blades 7. Thus the seed are arranged by the member 9 in partial alinement, while the blades 7 complete and perfect the alinement of the seed, and as the said blades rotate about the axis of the shaft 6 the line of seed is dropped down through the casing 2 into the furrow opened by the shoe 1. Therefore it will be seen that the seed is rearranged from a cluster or bunch into an accurate line and the line of seed is deposited in the ground in alinement with the hills of seed which are being planted. When the seed germinates and the plants spring up, they may be easily and quickly thinned by removing the superfluous plants and without damage to the plants left standing.

Having thus described the invention, what is claimed as new is:

The combination of a runner, a chute arranged above and in vertical alinement with the runner, a casing having open top and bottom interposed between and secured to the runner and the chute, one side of the casing having a concave inner surface, a door closing the opposite side of the casing and having a concave inner surface, a shaft journaled in the front and rear ends of the casing and extending longitudinally of the runner in the central vertical plane of the casing and concentric with said concave surfaces, blades radiating from said shaft and extending longitudinally of the casing, a gear wheel arranged on said shaft exteriorly of the casing, the housing arranged on the casing, a shaft supported by said housing, a gear wheel arranged on said shaft and meshing with the first-mentioned gear wheel, a drive shaft having an operative connection with the shaft which is supported by the housing, a hollow shaft receiving said drive shaft, means for rotating said hollow shaft, and a deflector having downwardly diverging sides secured transversely in the upper portion of the chute with the lower edges of said sides spaced from the front and rear sides of the chute respectively, the interior of the chute between the deflector and the radiating blades being unobstructed.

In testimony whereof I affix my signature in presence of two witnesses.

WILLIAM G. JOHNSON. [L. S.]

Witnesses:
  W. E. STALNAKER,
  D. K. CUNNINGHAM.

---

Copies of this patent may be obtained for five cents each, by addressing the "Commissioner of Patents, Washington, D. C."